Patented Oct. 21, 1952

2,615,159

UNITED STATES PATENT OFFICE 2,615,159

WAXY TRIGLYCERIDES

Frank L. Jackson, Cincinnati, Ohio, assignor to The Procter & Gamble Company, Cincinnati, Ohio, a corporation of Ohio No Drawing. Application May 28, 1949, Serial No. 96,150

19 Claims. (Cl. 260—410.8)

This invention relates to triglycerides having two adjacent short chain fatty acid radicals and one long chain fatty acid radical and possessing unusual and useful properties in certain novel polymorphic forms.

Complex mixtures of mixed triglycerides which constitute animal and vegetable oils and fats of nature (hereinafter generically referred to as "fats") undergo gradual solidification on cooling and assume the soft, greasy, largely opaque form to which we are accustomed. The rigidity of these so-called "solid" fats is commonly due to an interlocking network of crystals; their softness and greasiness and their transmission of a small amount of light is due to their content of liquid oil which remains enmeshed between the crystals. Only on further cooling does the material become wholly solid and liquid-free, and when this is the case it becomes opaque, hard, brittle and non-greasy. When such wholly solid fats are warmed, the presence of a variety of mixed triglycerides of different melting points results in gradual softening and gradual increase in greasiness, the melting range being wide. Pure individual triglycerides of high molecular weight, in contrast to the mixtures found in natural fats, have a narrow melting range and may be warmed up to their incipient melting point without becoming greasy; such compounds, when solid, are hard, brittle, and opaque.

I shall describe my invention first by referring to 1-stearyl-2,3-diacetin as illustrative thereof, reserving until later a discussion of other triglycerides which when in waxy translucent form are within its scope.

I have prepared 1-stearyl-2,3-diacetin as a waxy, translucent solid. Fat in such a state is novel and is capable of a wide variety of uses for which it is markedly superior to conventional fats, as will be shown more fully hereinafter.

Known methods may be used in synthesizing 1-stearyldiacetin and the other synthetic fats herein contemplated, and I do not restrict myself to any particular method of making them. For example, a very convenient method of preparing 1-stearyldiacetin in pure form is to dissolve unsymmetrical monostrearin in chloroform, to add an amount of dry pyridine at least chemically equivalent to the acid chloride which is to be used, to chill this solution in an ice-water bath, and then to add slowly in amount of acetyl chloride slightly in excess of the amount theoretically required to acetylate the monostearin. The reaction mixture is warmed gradually to room temperature, is stored for 2 days at 50-55° C., is taken in freshly distilled ethyl ether, and is washed successively with 0.5 N-$H_2SO_4$, 10% aqueous $K_2CO_3$, and water. The 1-stearyldiacetin is then crystallized repeatedly from alcohol and from alcohol-ether mixtures, at from about —18° C. to about 0° C. A sample so prepared had zero hydroxyl value, 0.2 acid value and 380.4 saponification value, as compared with theoretical values of zero, zero and 381 respectively.

This product is capable of crystallizing in a completely stable form which is an essentially opaque, liquid-free, hard, brittle and friable solid, which form is thus similar to the form of conventional fats when they are cooled sufficiently to be wholly solid. This conventional opaque form is the form assumed when unsymmetrical stearyldiacetin cools very slowly from the melt or when the molten material is held for long periods of time at a temperature near its melting point.

However, in addition to and in contrast with the form just described, 1-stearyldiacetin may also be made to assume another form by crystallizing rapidly from a solvent such as petroleum ether or ethyl alcohol or mixtures of ethyl alcohol and diethyl ether, or alternatively by chilling the molten material to a temperature below its minimum melting point as discussed more fully hereinafter. Such treatments result in the assumption of the novel solid form hereinbefore referred to. This form is best described as "waxy" in that it is plastic, yielding, pliable, impressionable, non-brittle, non-friable, to a limited degree elastic, capable of being cut, scratched or deformed without fracturing but lacking in stickiness, tackiness or greasiness. These are the properties referred to hereinafter when the term "waxy" is used. This novel solid form of unsymmetrical stearyldiacetin is also characterized by great translucency. In thin layers of only 2 or 3 millimeters it appears to be wholly clear and transparent; in thicker layers (5–10 mm. for example) it transmits a large proportion of incident light, although some of this transmitted light is diffused so that objects viewed through the fat layer suffer some blurring of outline. In bulk, the fat has a colorless, wax-like appearance.

Unsymmetrical stearyldiacetin in this form has a narrow melting range and is wholly solid, as contrasted with the so-called "solid" forms of many conventional fats which as previously stated may appear to be solid even though much liquid oil is enmeshed within the network of crystals which give to them their rigidity. As a result unsymmetrical stearyldiacetin is nongreasy and upon heating does not leak oil until melting takes place. The softness of the liquid-free solid over a wide temperature range below melting is in remarkable contrast to the hardness of conventional fats when they are entirely solid and liquid-free.

It will aid in understanding the invention to explain that triglycerides which constitute naturally occurring fats, as well as synthetically prepared triglycerides of higher fatty acids, assume various polymorphic forms when they solidify, these forms having different melting points. The less stable forms are capable of transforming into more stable forms, the transformation being influenced by the temporal and thermal history of the material. The lowest melting form of previously known high molecular triglycerides has commonly been called "alpha" and the highest melting form, "beta," the former being unstable, the latter being stable. An intermediate unstable form known as "beta prime" also frequently exists. However, in none of their polymorphic forms do conventional fats have the waxy translucent properties which 1-stearyldiacetin possesses when it has been subjected to suitable treatment as hereinbefore described.

The various polymorphic forms of a given fat may in some cases be distinguished from one another by macroscopic or microscopic examination, by their melting points or their dilatometric behavior, or by the manner in which they transform into other forms under given thermal treatment. However, X-ray diffraction affords in general the most accurate means of identification, the alpha form for example being characterized by a strong short-spacing line at about 4.1 to 4.2 Å., accompanying which a very weak line at about 2.35 to 2.45 Å. can be detected.

The alpha form of conventional fats commonly crystallizes when the fat is chilled rapidly to a temperature below its minimum melting point, i. e. below that of its alpha form, but this alpha form is unstable and converts into a higher-melting form, the conversion taking place more rapidly when the fat is heated nearly to its melting point. In most cases, fats convert from low melting alpha to high melting beta form either by solid phase conversion or by passing through the liquid phase. On the other hand, having once assumed the higher-melting form they cannot again convert to the lower-melting form without first being melted.

1-stearyldiacetin crystallizes from the molten state in opaque beta form when held for long periods of time (24 hours, for example) at a temperature slightly below its maximum melting point or when cooled very slowly. If, however, the melt is cooled rapidly, as for example by refrigeration or by immersion in ice water, to a temperature below its minimum melting point, crystallization in the opaque form is avoided and instead a waxy translucent non-greasy solid form is assumed. A chilling rate of 1° C. per 2 or 3 minutes has resulted in crystallization into solid waxy translucent form, but it is not imperative that the cooling be at this rate. Slower rates are also operative in many cases, so long as crystallization in opaque beta form is avoided. If the crystallization temperature is only slightly (1° or 2° C.) below the minimum melting point, the crystalline form is alpha, as shown by X-ray diffraction lines. In contrast to the instability of conventional fats in the alpha form, 1-stearyldiacetin in this form exhibits great (although not absolute) stability against transformation into the higher-melting beta form. For example, it may be held for many weeks (normally at least 3 or 4) at a temperature about 8° C. below its melting point before such transformation, which is gradual, becomes apparent.

If, one the other hand, the alpha form of 1-stearyldiacetin be cooled to and held at a temperature considerably below its melting point (of the order of 20° C. or more below) it undergoes a change, normally within 5 or 10 minutes' time, which does not affect its waxy, translucent character, but which is evidenced by a change in X-ray diffraction. In this new form, which I shall call "subalpha," the strong short-spacing line at about 4.1 to 4.2 Å. which is characteristic of alpha remains unchanged, but the weak line at about 2.4 Å. disappears, to be replaced by a moderately strong line at about 3.7 Å. and a plurality of other weaker lines. This subalpha form of 1-stearyldiacetin has no melting point; it is in reversible solid-to-solid equilibrium with the alpha form at a transition temperature.

It is apparent that the alpha form of 1-stearyldiacetin can be attained from either direction, either by warming the subalpha form or by chilling the molten fat to a temperature not greatly below the melting point of the alpha form.

Table 1 gives melting points and X-ray data for 1-stearyldiacetin, as well as for 1-palmityldiacetin to be discussed later. The melting points are for complete melting and are reproducible to within about ±0.2° C. The temperature range from incipient to complete melting is normally of the order of about 1° C. No beta prime form has been found for these two fats.

The X-ray diffraction patterns were obtained by the general technique described in George L. Clark's "Applied X-rays," third (1940) edition, chapter XIII. A beam of X-rays from a copper target in a vacuum tube operating at 40–45 kilovolts (peak on rectified current) and 20 milliamperes was collimated by means of a pin hole system in order to render the beam essentially parallel. These rays were then passed through a thin layer of the triglyceride sample in a thin-walled glass capillary, and the resulting diffracted rays were recorded on a flat photographic plate located at a measured distance either 5 or 10 centimeters beyond the sample. The duration of exposure of the plates was about one hour at the 5 cm. distance and about 4 hours at the 10 cm. distance. Between sample and plate a nickel foil was placed in order to filter out the copper K-beta wave lengths. The short-spacings and the long-spacings recorded in Tables 1 and 2 were calculated in conventional manner, using Bragg's law, from the resulting diffraction rings. The relative intensities of these rings are indicated thus:

$VS$ = very strong
$S$ = strong
$M$ = medium strong
$W$ = weak
$VW$ = very weak
$VVW$ = very very weak

TABLE 1

*Diacetyl triglycerides*

|  | 1-Stearyldiacetin ||| 1-Palmityldiacetin |||
| --- | --- | --- | --- | --- | --- | --- |
|  | Subalpha | Alpha | Beta | Subalpha | Alpha | Beta |
| Melting Pt., °C | | 34.1 | 47.8 | | 22.4 | 42.3 |
| Approx. Temp. of Transformation to subalpha °C | 0 to 10 | 0 to 10 | | −10 to 0 | −10 to 0 | |
| Long Spacing, Å, found | 37.1 | 36.5 | 34.0 | 34.7 | 34.1 | 31.5 |
| Long Spacing, Å, calculated | 35.9 | 35.9 | 34.0 | 33.4 | 33.4 | 31.8 |
| Short Spacings, Å | | | | | | 5.25 M |
| | | | 4.85 M | | | 4.85 M |
| | | | 4.64 S | | | 4.63 S |
| | | | 4.40 VW | | | |
| | 4.13 VS | 4.13 VS | 4.13 W | 4.13 S | 4.13 VS | 4.14 W |
| | | | 3.77 VS | | | 3.77 VS |
| | 3.66 M | | | 3.64 M | | 3.63 VW |
| | | | 3.45 W | | | 3.35 VW |
| | | | 3.29 W | | | 3.21 VW |
| | | | 3.13 W | | | 3.12 VW |
| | 2.95 W | | 2.92 VW | 2.96 W | | 2.92 VW |
| | 2.75 VVW | | | 2.76 VW | | 2.77 VVW |
| | | | | | | 2.66 VW |
| | 2.50 W | | 2.51 W | 2.52 W | | 2.49 W |
| | | 2.40 W | 2.43 W | | 2.42 VVW | 2.40 W |
| | | | 2.29 VW | | | |
| | 2.20 W | | 2.18 W | 2.23 W | | 2.15 W |
| | | | 2.06 W | 2.08 VW | | 2.04 W |
| | | | | | | 1.95 VW |
| | | | 1.80 VW | | | 1.88 VW |

X-ray long spacings are informative as to the length of the structural units of triglyceride crystals. This length is essentially a function of the acyl radicals composing a unit structure, since the contribution of the glyceryl radical is small. If the length of the structural unit is double the length of the acyl radical, the fat is said to have a double-chain-length structure, and conclusions are possible as to the architecture of the structure. Conventional fats, in the alpha form, are double chain length. The calculated long spacings in Table 1 are derived by the method of Lutton, described in Jour. Am. Chem. Soc., 70, 248 (1948), and are based upon the assumption of a triple-chain-length. From the agreement in order of magnitude between the values found and those calculated, it is concluded that the alpha and subalpha forms of these diacetyl triglycerides are of triple-chain-length. This fact is hereinafter indicated by the notations "alpha-3" or "subalpha-3." The beta forms in Table 1 are also triple-chain-length, but these chains are not vertical to the glyceryl planes; their angle of tilt is about 60°–70°. These diacetyl triglycerides thus are capable of assuming any of three polymorphic forms, beta-3, alpha-3 and subalpha-3, but only in the latter two forms do they have the novel waxy translucent qualities which characterize my invention.

It will be perceived that 1-stearyldiacetin differs morphologically from any previously known fats, that in the alpha-3 and subalpha-3 forms it possesses remarkable physical properties which distinguish it from previously known fats, and that it is sufficiently stable in these forms to permit its utilization in applications for which its unique properties render it particularly suitable. It is especially desirable for edible purposes, since it is free from objectionable color, odor or flavor, has a melting point slightly below body temperature, and as judged by growth response and by fat utilization or digestion in nutritional studies with test animals it is nutritionally similar to conventional edible fats. When chewed in the mouth it is somewhat like a gum, and its final melting is accompanied by a cooling sensation. Being non-greasy even at higher temperatures (below its melting point) and non-brittle even at lower ones, and since it can be heated almost to its melting point before softening or leaking liquid oil, it is especially suitable for use in candy, as chocolate coverings, in icings and frostings, as a spray oil for crackers, as coatings for edible products such as fruits, cheese, preserves and frozen meats, as edible "beeswax" in synthetic honey, as an edible chewing gum base and for many similar uses. It is also suitable for many inedible purposes, such for example as in hair dressing liquids, in vaginal suppositories, as fatty carriers for medicines, etc.

Since in most physical properties (except density and melting point) the alpha-3 form and the subalpha-3 variety thereof are generally similar and are in reversible solid-to-solid equilibrium with one another, it is not of much practical importance which form the 1-stearyldiacetin is in. For example, a pliable coating of this compound may exist at one temperature in one of these forms and at another temperature in the other form, and yet appear the same and perform its function equally well in both. However, the alpha-3 form has a limited lifetime at temperatures near its melting point, even though far more stable than the alpha form of conventional fats. The subalpha-3 form is useful as a source, completely stable at low temperature, from which the alpha-3 form can be obtained readily by warming to above the transition temperature.

Unsymmetrical triglycerides containing two acetyl groups and an acyl group of behenic, arachidic, palmitic, myristic, or lauric acid can also be prepared, by methods similar to those described for 1-stearyldiacetin, in relatively stable waxy translucent non-greasy form, characterized by X-ray diffraction as alpha-3 or sub-alpha-3, and they also have useful applications when in this form, generally similar to those described above for the stearyl compound. Table 1 gives data for 1-palmityl-2, 3-diacetin. It is morphologically similar to 1-stearyldiacetin, but the melting point is lowered by shortening the long chain. Further shortening of the long chain lowers the melting point further, while lengthening the chain raises it, and a series of fats having the disclosed properties but melting at different temperatures is thus provided. Such fats are useful for specific purposes, although their general usefulness is in some cases limited by the temperature range within which they are solid. If the long chain is too short, the subalpha-3 waxy translucent form may persist up to the melting point, but if the high molecular acyl is that of a saturated fatty acid of 16 or more carbons, the diacetyl fat converts from subalpha-3 to alpha-3 on warming, before melting occurs.

Instead of the saturated high molecular acyl groups of the preceding paragraph, unsaturated acyls, such for example as oleyl, may be substituted, and these products also may be crystallized in waxy translucent form. The melting point of such triglycerides is lower than that of the saturated compounds, and here again the subalpha form may persist up to the melting point.

In the case of unsymmetrical diacetyl fats containing saturated fatty acyls of 16 to 22 carbon atoms, the alpha-3 form may be crystallized directly from the melt by chilling to a temperature slightly below the melting point of the alpha-3 form, as has been previously pointed out. Knowledge of the alpha-3 melting point may be derived from previous experience with the particular material in question. However, if this melting point is unknown, it may be determined conveniently and rapidly by placing some of the molten triglyceride in thin walled glass capillaries, thrusting these into ice water or some other cooling liquid so that the fat solidifies rapidly, and then thrusting successive capillaries into liquid baths of different temperatures and noting the lowest temperature at which the material melts; this will be the melting point of the alpha-3 form.

Good results can also be obtained rapidly by a somewhat similar procedure in which a capillary containing the molten material is cooled at a rate of about 1° C. per minute, and the temperature is noted at which cloudiness first appears in the liquid. This cloud point will commonly be not more than 1° or 2° C. below the melting point of the alpha-3 form.

A more tedious method of determining the temperature range within which rapid chilling of the material results in solidification of the alpha-3 form, but a valuable method because it yields information also as to the formation of the subalpha-3 form, is to solidify rapidly at different temperatures a series of capillaries filled with the molten material and, without delay and without change in temperature which would effect the polymorphic form, to determine the X-ray diffraction pattern of each. Each polymorphic form can in this way be recognized and identified, and a range of solidification temperatures can be established above which the alpha-3 form does not crystallize and below which the subalpha-3 form crystallizes.

In addition to preparing the alpha-3 form directly from the melt, it will be perceived that it may also be prepared by an indirect thermal treatment in those cases where the long chain acyl groups of the triglyceride are substantially saturated and contain at least 16 carbon atoms. The thermal treatment involved comprises cooling the melt to a temperature below the temperature of transition between alpha and subalpha, thereby converting the fat into the subalpha form, in which form it is indefinitely stable at this temperature. It may thus be stored at this temperature as long as may be desired, and at any later date it may be warmed to above this transition temperature but below the melting point of the alpha form, thereby converting it into the alpha form which is of moderate stability. This procedure is of practical advantage in permitting manufacture to take place a long time prior to intended use of the material. From a practical point of view, it will be seen that it is immaterial whether in the above described procedure the material crystallizes first as alpha and later transforms to subalpha in the initial cooling, nor does it matter whether a pause intervenes in the alpha form after solidifying from the melt and before converting into subalpha.

In the manner described for the diacetyl triglycerides, corresponding unsymmetrical dipropionyl and dibutyryl triglycerides have also been prepared in the unique waxy translucent form, and these are also within the scope of my invention. Such fats may be synthesized in pure form by conventional methods, such for example as that which I have described for 1-stearyldiacetin. Illustrative melting point and X-ray data for 1-stearyldipropionin and for 1-stearyldibutyrin and 1-palmityldibutyrin are given in Tables 2 and 3 respectively.

TABLE 2

*1-stearyldipropionin*

| | Subalpha | Alpha | Beta |
|---|---|---|---|
| Melting Point °C | | 23.5 | 31.7 |
| Approx. Temp. of Transformation to Subalpha °C | 5–10 | 5–10 | |
| Long Spacing Found, Å | 40.5 | 39.5 | 34.1 |
| Long Spacing Calculated, Å | 38.4 | 38.4 | 36.3 |
| Short Spacings, Å | | | 7.82 M |
| | | | 7.02 W |
| | | | 5.50 M |
| | | | 4.92 VW |
| | | | 4.60 VS |
| | | | 4.35 W |
| | 4.21 VS | 4.14 VS | 4.11 W |
| | | | 3.94 S |
| | 3.77 S | | 3.68 M |
| | | | 3.50 W |
| | | | 3.28 W |
| | | | 3.14 VW |
| | 3.02 W | | 3.08 VW |
| | | | 2.84 W |
| | | | 2.64 VW |
| | 2.53 W | | 2.59 W |
| | | 2.41 VVW | 2.38 VW |
| | | | 2.32 W |
| | 2.24 W | | 2.20 W |
| | | | 2.14 VW |
| | | | 2.06 W |
| | | | 2.00 W |
| | | | 1.95 VVW |
| | | | 1.83 VW |
| | | | 1.78 VVW |

TABLE 3
*Dibutyryl triglycerides*

|  | 1-Stearyldibutyrin | | 1-Palmityldibutyrin | |
| --- | --- | --- | --- | --- |
|  | Subalpha | Alpha | Subalpha | Alpha |
| Melting Pt., °C | | 15.6 | | 2.9 |
| Approx. Temp. of Transformation to subalpha °C | 2 to 8 | 2 to 8 | −10.5 to −4.5 | −10.5 to −4.5 |
| Long Spacing, Å, found | 42.1 | 42.3 | 39.9 | 39.6 |
| Long Spacing, Å, calculated | 40.9 | 40.9 | 38.4 | 38.4 |
| Short spacings, Å | 4.20 VS | 4.14 VS | 4.20 VS | 4.13 VS |
| | 3.71 S | | 3.71 S | |
| | 3.00 W | | 3.01 VW | |
| | 2.54 M | | 2.55 W | |
| | | 2.39 VVW | | 2.42 VVW |
| | 2.26 W | | 2.26 VW | |
| | 2.09 VW | | | |

These dipropionyl and dibutyryl compounds have progressively lower melting points than the corresponding diacetyl compounds. They also are of triple-chain-length. Those in which the high molecular acyl is saturated and of 16 or more carbon atoms are stable at low temperatures in the subalpha-3 form, they transform reversibly, solid-to-solid, from waxy translucent subalpha-3 to waxy translucent alpha-3 when the temperature is raised and they crystallize in the alpha-3 form when chilled from the melt. However, the saturated dibutyryl compounds from palmityl to behenyl (in contrast to the diacetyl and dipropionyl compounds) appear to be completely stable in the alpha-3 form at temperatures near their melting point and not to convert into higher melting beta or beta prime forms.

As in the case of the diacetyl compounds, so in the case of the diopropionyl and dibutyryl compounds in which the high molecular acyl is unsaturated or of less than 16 carbon atoms there is some doubt whether crystallization in the alpha-3 form takes place, the waxy translucent subalpha-3 being the prevailing form which crystallizes at low temperature.

Also included in my invention are unsymmetrical high molecular triglycerides of the type described, in which the two short chain acyl groups are different from one another, since such compounds also crystallize in waxy, translucent form when chilled under conditions such as I have described.

Broadly, my invention thus covers synthetic fats of the formula

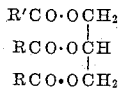

wherein R'CO· represents acyl radicals of saturated or unsaturated fatty acids of 12 to 22 carbon atoms, and wherein the RCO· radicals may be acetyl, propionyl or butyryl, the two RCO· radicals being either the same or different radicals as desired, these triglycerides being in waxy translucent crystalline form. The waxy translucent crystalline form referred to may be either the alpha-3 or the subalpha-3 polymorphic form, best characterized by X-ray data substantially as described hereinbefore. All of the compounds of the invention are capable of existence as waxy translucent solids in the subalpha-3 form, whereas there is some question in the case of a portion of them, as hereinbefore explained, whether they are capable of independent existence in the alpha-3 form.

The presence of substantial amounts of triglycerides solely of high molecular fatty acids, or of diglycerides, monoglycerides or other organic impurities interferes with sharpness of melting point and with clear-cut polymorphic behavior of the triglycerides of the invention. For example, increasing proportions of conventional fats mixed with products of this invention decrease sharpness of melting, waxiness and translucency, and produce greasiness. Nevertheless, many fatty compositions comprising predominantly unsymmetrical triglycerides having two short chain acyls and one long chain acyl, but containing other compounds as well, crystallize in waxy translucent form when cooled as hereinbefore described and are so stable in that form that they are useful for many purposes, and such compositions are within the scope of the invention. Solid food ingredients with a melting point above 30° C. but below body temperature (37° C.) and containing 1-stearyldiacetin or 1-palmityldiacetin in the waxy, translucent form are especially useful where melting or partial melting at room temperature is undesirable. A candy coating comprising both 1-stearyldiacetin and hydrogenated vegetable oils in as example of such a solid food ingredient.

Having thus described the invention, what I claim and desire to secure by Letters Patent is:

1. A triglyceride of the formula

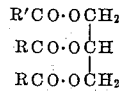

wherein R'CO· is the acyl radical of a fatty acid of 12 to 22 carbon atoms and each RCO· is selected from the group consisting of acetyl, propionyl and butyryl radicals, said triglyceride being in a waxy translucent alpha crystalline form as determinable by melting point and X-ray diffraction measurements.

2. A triglyceride of claim 1 wherein the waxy translucent crystalline form is a subalpha-3 form.

3. A triglyceride of the formula

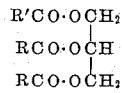

wherein R'CO· is the acyl radical of a fatty acid of 12 to 22 carbon atoms and both RCO· radicals are the same radical selected from the group consisting of acetyl, propionyl and butyryl radicals, the said triglyceride being in a waxy translucent alpha crystalline form as determinable by melting point and X-ray diffraction measurements.

4. A triglyceride of claim 3 wherein the waxy translucent crystalline form is subalpha-3.

5. A triglyceride of the formula

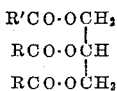

wherein R'CO· is the acyl radical of a saturated fatty acid of 12 to 22 carbon atoms and each RCO· is selected from the group consisting of acetyl, propionyl and butyryl radicals, said triglyceride being in a waxy translucent alpha crystalline form as determinable by melting point and X-ray diffraction measurements.

6. A triglyceride of claim 5 wherein the waxy translucent crystalline form is subalpha-3 form.

7. A triglyceride of the formula

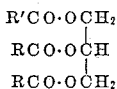

wherein R'CO· is the acyl radical of a saturated fatty acid of at least 16 carbon atoms and each RCO· is selected from the group consisting of acetyl, propionyl and butyryl radicals, said triglyceride being in a waxy translucent alpha crystalline form as determinable by melting point and X-ray diffraction measurements.

8. A triglyceride of the formula

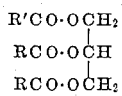

wherein R'CO· is the acyl radical of a saturated fatty acid of at least 16 carbon atoms and both RCO· radicals are the same radical selected from the group consisting of acetyl, propionyl and butyryl radicals, said triglyceride being in a waxy translucent alpha-3 crystalline form as determinable by melting point and X-ray diffraction measurements.

9. A triglyceride of the formula

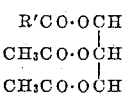

wherein R'CO· is the acyl radical of a saturated fatty acid of 12 to 22 carbon atoms, said triglyceride being in a waxy translucent alpha crystalline form as determinable by melting point and X-ray diffraction measurements.

10. The triglyceride of claim 9 wherein the waxy translucent crystalline form is subalpha-3 form.

11. 1-stearyl-2,3-diacetin in a waxy translucent crystalline form as determinable by melting point and X-ray diffraction measurements.

12. 1-stearyl-2,3-diacetin in a waxy translucent alpha-3 crystalline form as determinable by melting point and X-ray diffraction measurements.

13. 1-stearyl-2,3-diacetin in a waxy translucent subalpha-3 crystalline form as determinable by melting point and X-ray diffraction measurements.

14. 1-palmityl-2,3-diacetin in a waxy translucent crystalline form.

15. 1-palmityl-2,3-diacetin in a waxy translucent alpha-3 crystalline form.

16. 1-palmityl-2,3-diacetin in a waxy translucent subalpha-3 crystalline form.

17. A solid food ingredient having a melting point between 30° and 37° C. and comprising predominantly 1-stearyl-2,3-diacetin in waxy translucent form.

18. A solid food ingredient having a melting point between 30° and 37° C. and comprising predominantly 1-palmityl-2,3-diacetin in waxy translucent form.

19. The process which comprises chilling a molten fat of the formula

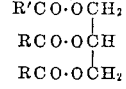

wherein R'CO· is the acyl radical of a saturated fatty acid of at least 16 carbon atoms and both RCO· radicals are the same radical selected from the group consisting of acetyl, propionyl and butyryl radicals, to a temperature below the transition temperature of said fat from alpha-3 to subalpha-3 polymorphic form, and at any time thereafter raising the temperature of the fat to above said transition temperature but below the melting point of the alpha-3 form of said fat and maintaining the temperature within these temperature limits to effect transformation of said fat into the waxy translucent alpha-3 form.

FRANK L. JACKSON.

REFERENCES CITED

The following references are of record in the file of this patent:

UNITED STATES PATENTS

| Number | Name | Date |
|---|---|---|
| 1,558,299 | Schwartz | Oct. 20, 1925 |
| 2,091,988 | Hubbuch | Sept. 7, 1937 |
| 2,442,532 | Eckey | June 1, 1948 |